United States Patent [19]
Ljokkoi et al.

[11] Patent Number: 5,094,715
[45] Date of Patent: Mar. 10, 1992

[54] ARRANGEMENT FOR REMOVING THREAD-LIKE IMPURITIES FROM A DEFIBERIZING DRUM

[75] Inventors: Risto Ljokkoi, Karhula; Mauri Viitanen, Poitsila, both of Finland

[73] Assignee: Ahlstrom Corporation, Noormarkku, Finland

[21] Appl. No.: 639,799

[22] Filed: Jan. 10, 1991

[51] Int. Cl.$^5$ ................................................ D21B 1/32
[52] U.S. Cl. ............................................ 162/4; 162/55; 162/261; 241/79.3; 366/228
[58] Field of Search ................ 162/4, 55, 251, 261; 241/72, 79.3; 209/270; 366/228, 234, 235

[56] References Cited

U.S. PATENT DOCUMENTS

| | | |
|---|---|---|
| 2,337,137 | 12/1943 | Thompson et al. .................. 68/144 |
| 3,459,380 | 8/1969 | Kartman ............................... 241/72 |
| 4,519,224 | 5/1985 | Seifert et al. ........................... 68/27 |
| 4,687,146 | 8/1987 | Sundman ............................ 241/79.3 |
| 4,804,439 | 2/1988 | Fredriksson ............................ 162/4 |

FOREIGN PATENT DOCUMENTS 1296562 5/1969 Fed. Rep. of Germany ...... 366/228

Primary Examiner—Karen M. Hastings
Attorney, Agent, or Firm—Cohen, Pontani & Lieberman

[57] ABSTRACT

The present invention provides an improved arrangement for removing thread-like impurities, such as wire rope, wire and the like, from a defiberizing drum or the like used in the defiberizing of waste paper. A ramped or inclined member, in the form of a bar or a lath, is disposed within a first or inlet portion of the drum and is secured to the drum casing wall at a predetermined distance from the partition wall that separates the first portion from a second portion of the drum. As the drum operatively rotates, a wire ball or mass forming within the first drum portion is elevated by the ramped member to a height sufficient to bring the mass into proximity with an opening defined in the partition wall, thereby directing the mass through the partition wall opening and into the second portion of the drum for further processing and/or discharge from the drum.

11 Claims, 3 Drawing Sheets

ARRANGEMENT FOR REMOVING THREAD-LIKE IMPURITIES FROM A DEFIBERIZING DRUM

FIELD OF THE INVENTION

The present invention is directed to an arrangement for removing thread-like impurities, such as wire rope, wire and the like, from a defiberizing drum or like apparatus used for defiberizing of waste paper.

BACKGROUND OF THE INVENTION

The defiberizing drum as currently known and long used is generally implemented in the form of a cylinder of several meters in length and a diameter of approximately two meters. The cylinder casing is formed of two portions, the first being non-perforated and the second perforated. The cylinder is normally mounted for use in a slightly inclined position or orientation so that the outer end of the first, imperforate portion is disposed higher than the outer end of the second, perforated portion. The cylinder interior, as circumferentially bounded by the casing, is further divided into two portions by a partition wall which separates the non-perforated portion from the perforated portion of the casing. An opening—which may, in accordance with the cylinder type and producer, by either symmetric or asymmetric, and round or of some other shape—is defined in the partition wall and enables fluid and particulate communication between the two portions of the cylinder. The outer end of the first or relatively raised portion of the cylinder is provided with means for feeding waste paper to that relatively lower portion of the cylinder bounded by the non-perforated portion of the casing. This first portion of the casing is, moreover, usually provided with one or a plurality of axial ribs, the purpose of which is to raise or lift upwards, as the cylinder is operatively rotated, the waste paper fed to the cylinder and to then permit it to descend or fall downwards once again; the waste paper, by virtue of this repetitive and frequent movement, defiberizes thereby gradually forming a relatively homogeneous fiber suspension with water which is also supplied to the cylinder. As the pulp flows toward the partition wall separating the two longitudinally-defined portions of the cylinder, this mixture homogenizes whereby it may be transferred through the partition wall opening into the perforated portion of the cylinder in which the suspension fraction, which is sufficiently defiberized, passes through the casing perforations and flows outwardly from the second portion of the cylinder for further treatment of the accept. The undefiberized fraction, or that fraction otherwise including particles that are larger than the perforation openings, is on the other hand discharged from the distal end of the relatively lower, cylinder second portion for reject treatment.

When treating most impurities the defiberizing drum operates in the above-described manner; experience has, however, demonstrated that if the waste paper or like material being treated contains thread-like impurities such as wire, wire rope or the like, such impurities are not transferred through the opening in the partition wall of the drum to the perforated portion of the drum from which they can then pass to mix with the reject. Instead, they accumulate in the non-perforated portion of the drum, initially forming a spherical accumulation that gradually increases in size into a cigar-like ball or mass that extends the full length of the drum. The presence of this kind of ball or mass weakens the operation of the drum, reduces its effective capacity and easily breaks or damages the inner ribs of the cylinder, thus requiring considerable reparation costs and causing extended periods of lost use of the defiberizing drum assembly. Moreover, the discharge or removal of a large wire ball from the drum is both difficult and tedious.

OBJECTS AND SUMMARY OF THE INVENTION

It is accordingly an object of the present invention to provide a defiberizing drum that is operable to prevent undue accumulations of thread-like impurities which interfere with normal defiberizing operations of the drum, and thereby overcome the deficiencies of prior art defiberizing apparatus.

It is a further object of the invention to provide such a defiberizing drum that promotes ready discharge of thread-like impurities from the drum in balls or masses of predetermined size.

It is another object of the invention to provide such an improved defiberizing drum constructed such that prior art drums may be readily retrofitted to enjoy the advantages of the present invention.

In accordance with the present invention, the interior of the cylinder casing of at least one portion of the drum is provided, on the inlet side of the partition wall, with a ramped member located in spaced relation to the partition wall. During rotative operation of the drum, a wire ball or mass forming in the inlet portion of the drum rides along and is thereby lifted or elevated by the ramped member to the height of the partition wall opening, whereby the wire mass drops or passes through the opening into the next or discharge portion of the defiberizing drum.

Thus, by utilizing apparatus constructed in accordance with the present invention, the aforementioned accumulation of wires and the like into unduly large, oblong balls or masses is eliminated; the wires are, instead, discharged from the drum in balls or masses of a predetermined or desired size before they can grow to a size that interferes with or prevents their normal discharge from the drum.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein similar reference characters denote like elements throughout the several views:

FIG. 4 is a cross-sectional end view, taken along the lines IV—IV in FIG. 2, of the defiberizing drum of FIG. 2;

DETAILED DESCRIPTION OF THE PREFERRED EMBODIMENTS

Figure 1:
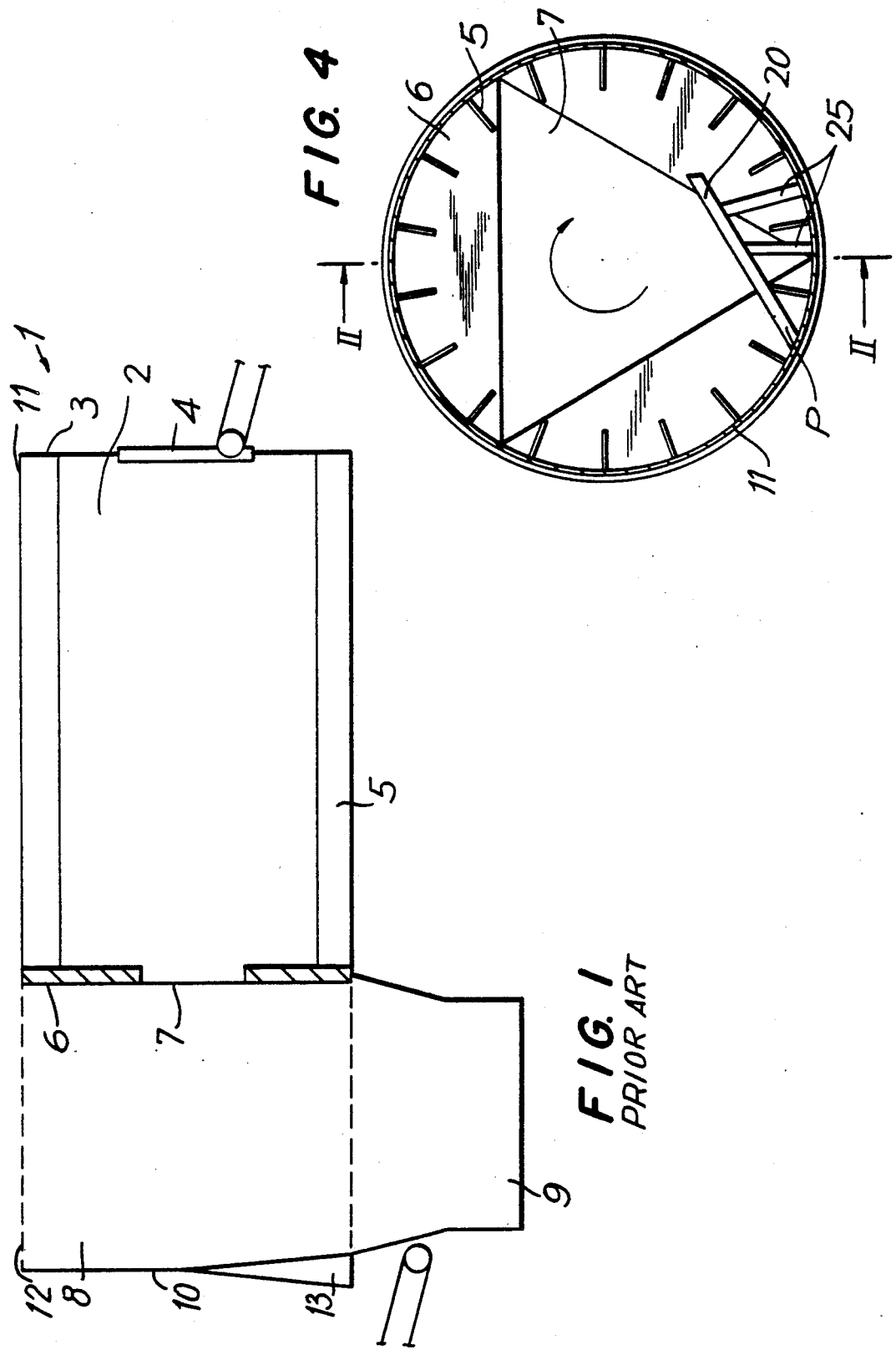
FIG. 1 is a cross-sectional side view of a conventional defiberizing drum.

The pertinent parts of a conventional defiberizing drum 1 are diagrammatically illustrated in FIG. 1. The first or intake portion 2 of the drum is circumferentially bounded by a non-perforated casing or wall portion 11 and is closed or restricted at its axial end by a wall or panel 3. An opening 4, through which material to be treated is fed to the first portion 2 of the drum, is defined in the end wall 3. The first drum portion 2 is provided with substantially axial ribs 5 secured to the inner surface of the casing wall portion 11. The axial end of the first drum portion 2 opposite the end wall 3 terminates in a partition wall 6 oriented substantially perpendicular to the longitudinal axis of the drum. The partition wall 6 includes a through opening 7 for admitting the defiberized material from the first portion 2 to a second portion 8 of the drum, the second portion 8 being bounded by a perforated casing wall portion 12. A discharge chute 9 or the like for the accept is arranged below the perforated wall portion 12. The second portion 8 of the drum terminates in an end panel or wall 10 in which is defined an opening 13 for the reject or, in other words, for that material which is not accepted for discharge to the chute 9 through the perforations in the casing wall 12.

Figure 2:
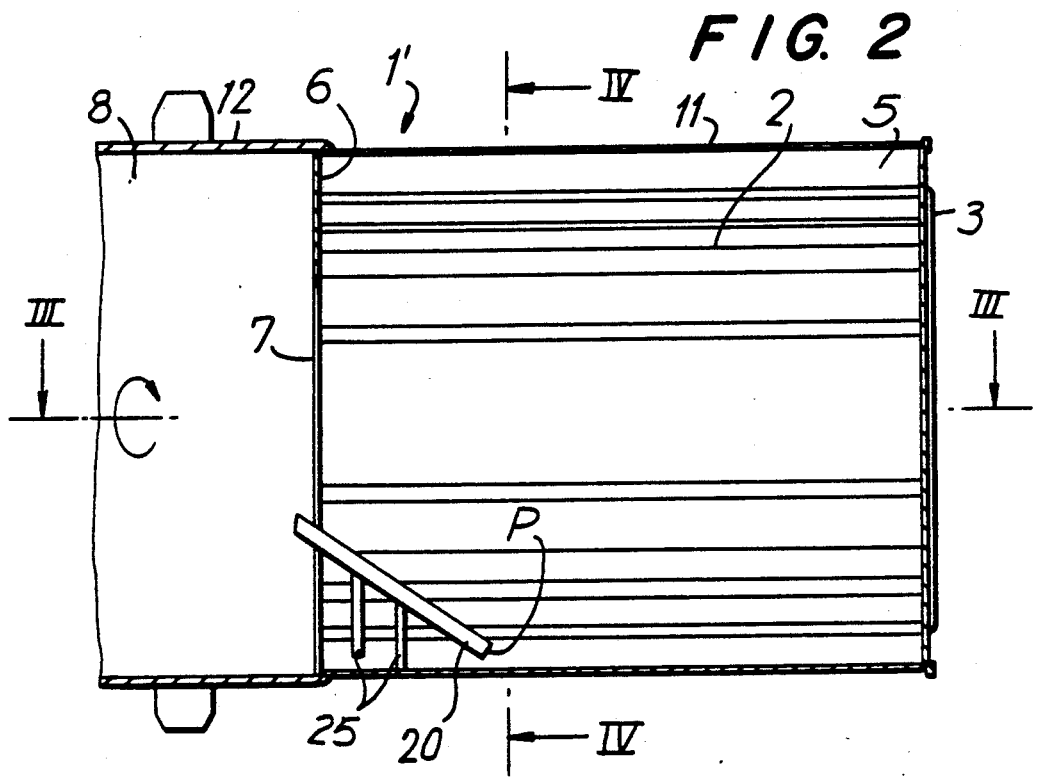
FIG. 2 is a cross-sectional side view, taken along the lines II—II in FIG. 4, of a first embodiment of a defiberizing drum constructed in accordance with the present invention.
Figure 3:
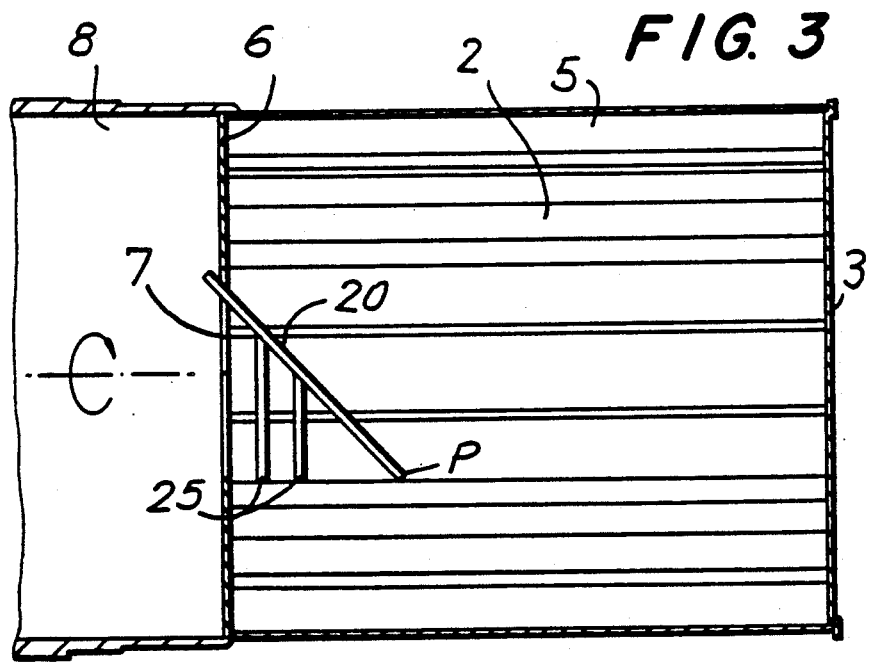
FIG. 3 is a cross-sectional top view, taken along the lines III—III in FIG. 2, of the defiberizing drum of FIG. 2.

A corresponding defiberizing drum 1' constructed, however, in accordance with a first embodiment of the present invention is illustrated in FIGS. 2, 3 and 4. In this embodiment a member 20, in the form of a bar or a lath, has been secured at a point P predeterminately spaced from the partition wall 6 to the inner surface of the casing wall 11 in the non-perforated portion 2 of the drum 1'. The bar or lath 20 extends, in the general manner of a ramp or inclined member, toward the partition wall opening 7 and, in the illustrated embodiment of the inventive drum, extends through the opening 7. The member 20 may be supported by at least one supporting bar or lath 25 connected to the drum casing wall 11. The function of member 20 is to prevent wire balls or masses forming in the drum portion 2 from growing larger than a desired or predetermined size. By virtue of the inclination of the drum 1' and the direction of pulp flow through the drum, such wires are conveyed into close proximity with the partition wall 6, where they become entangled with each other and begin to form spherical accumulations or masses. As the drum 1' operatively rotates (as indicated by the arrows in FIGS. 2, 3 and 4), the wire ball rolls substantially against or along that face of the partition wall 6 within the drum portion 2, continuously increasing in size as new wires become attached to the ball. While the wire ball is still small, it freely passes through the spaces or openings defined between the member 20 and its supports 25. When, on the other hand, the ball grows to a size sufficient to prevent its free passage under the member 20, i.e. through the spaces between the member 20 and the partition wall 6, the member 20 begins to lift or elevate the ball as the ball rides along the member 20 and supportedly against the partition wall 6 toward the partition wall opening 7. When the wire ball or mass reaches the opening 7, it falls through the opening 7 into the perforated drum portion 8, along the perforated casing wall 12 of which the ball rolls into the reject and outwardly through the opening 13 onto the reject conveyors or the like.

The general orientation and size of the member 20 may, by way of example, be as follows. With specific reference to the cross-sectional top view of FIG. 3, the angle of the member 20 relative to a radius of the drum 1' may be in the preferred range of −30° to +60°, and most preferably in the range of 0° to +45°. The negative angles are with respect to the securement point P of the member 20 and denote an incline against or counter to the rotational direction of the wire ball, which in practice means that the member 20 will lift the ball very high before dropping it through the partition wall opening 7 into the second portion 8 of the drum. In the cross-sectional end view of FIG. 4, the distance or elevation of the member 20 from the casing surface or wall 11 must be greater than the height of the partition wall opening from the casing wall 11. It is, as should be apparent, important that the member 20 and its supports 25 do not together form a box or the like in which the wire ball can easily become stuck or captive; rather, the ball should be able to roll during its entire growth process considerably freely along the face of the partition wall 6 until its diameter attains that predetermined size at which the ball is carried by or above the member 20 for passage through the opening 7 and discharge, as hereinabove described, out of the drum.

Figure 5:
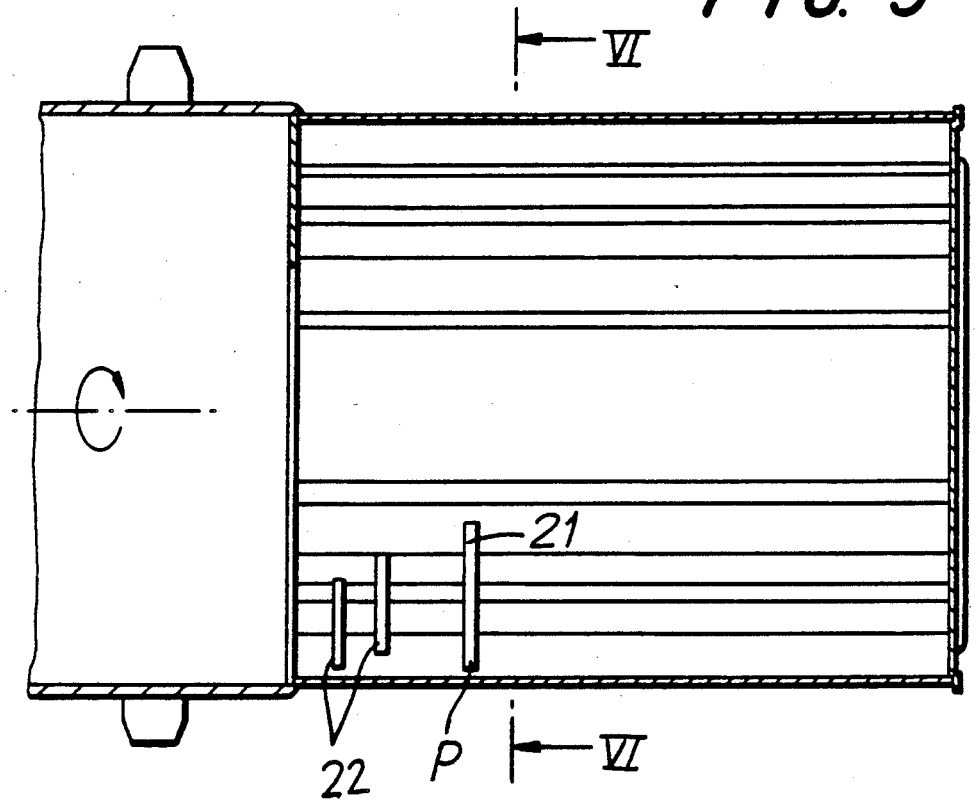
FIG. 5 is a cross-sectional side view, similar to FIG. 2 but partly broken away, of a second embodiment of a defiberizing drum constructed in accordance with the present invention and taken along the lines V—V in FIG. 6.
Figure 6:
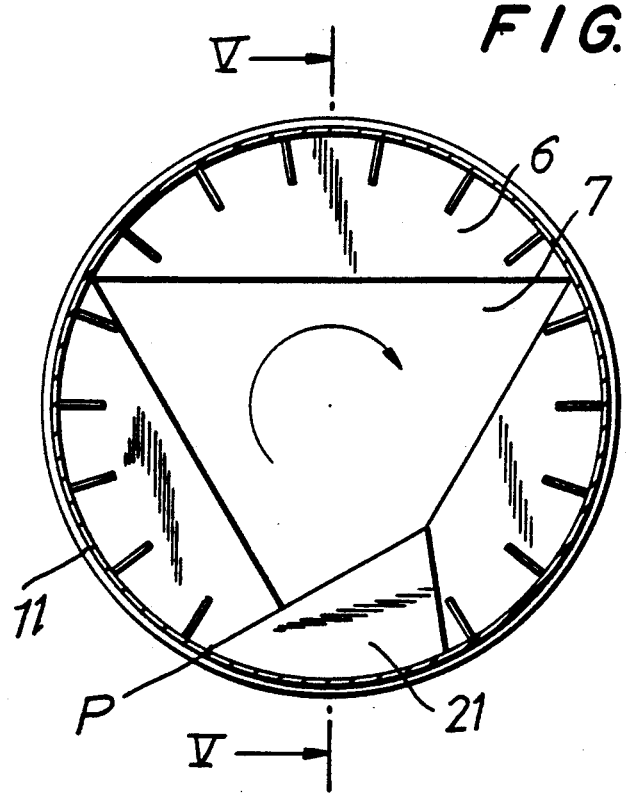
FIG. 6 is a cross-sectional end view, similar to FIG. 4 and taken along the lines VI—VI in FIG. 5, of the second defiberizing drum embodiment.

A second arrangement or embodiment of a defiberizing drum constructed in accordance with the present invention is illustrated in FIGS. 5 and 6. In this alternate embodiment, the lath or member 20 of FIGS. 2-4 is replaced by a plate 21 oriented substantially parallel to the partition wall 6 or a radius of the drum so as to prevent rotation of the wire ball or, in other words, to prevent the wire ball from passing into or through the gap defined between the plate 21 and the partition wall 6. The directional orientation of the upper edge of the plate 21 (FIG. 6) should at least generally correspond to the ramped orientation of the lath or member 20 in FIG. 4, or it may be even more steeply radial than the member 20 in which case the elevation of the upper edge of the plate 21 from the nonperforated casing surface 11 will, preferably, be greater. When desired or otherwise deemed appropriate, additional plates 21, 22 may be secured to the casing surface 11, each oriented substantially parallel to the partition wall 6 or drum radius and disposed one beside another (FIG. 5). It is further contemplated, in such a further modification, that those plates located closer to the partition wall 6 be elevated to a lesser extent than the plate 21 which is disposed most remote from the wall 6.

It can be now appreciated from the foregoing description and disclosure that the present invention provides a relatively simple and inexpensive arrangement which successfully eliminates the serious problems inherent in the use of prior art defiberizing drums for processing waste paper that includes thread-like impurities such as wire, wire rope and the like. The arrangement of the invention may, moreover, be readily retrofitted to conventional or preexisting defiberizing drum apparatus. Thus, the present invention operatively provides a new way of cleaning waste paper, whereby even recycled material which has been poorly stored and packed can be utilized since there is no longer a risk that thread-like impurities in the material being processed will cause serious risks to or in the operation of defiberizing drums.

While there have been shown and described and pointed out fundamental novel features of the invention as applied to several preferred embodiments thereof, it will be understood that various omissions and substitutions and changes in the form and details of the devices illustrated, and in their operation, may be made by those skilled in the art without departing from the spirit of the invention. It is the intention, therefore, to be limited only as indicated by the scope of the claims appended hereto.

What is claimed is:

1. A defiberizing drum for receiving material to be treated and operatively and continuously rotatable in a direction about a longitudinal axis of the drum for separating and discharging thread-like impurities from the drum, comprising:
    a substantially cylindrical casing;
    a partition wall extending substantially radially within said casing and dividing the drum into a first non-perforated portion and a second perforated portion, said partition wall having an opening defined therein for permitting the flow of material being treated from said first to said second drum portion; and
    a ramped plate or lath member secured to said casing in said first non-perforated portion of the drum at a securement point located a predetermined distance from said partition wall, said member extending in a non-axial drum direction and being configured so that, as the drum rotates about its axis, a wire ball forming in said first portion is elevated by said member into proximity with said partition wall opening such that the wire ball passes through said wall opening and into said second portion of the drum when the wire ball reaches a predetermined size.

2. A defiberizing drum in accordance with claim 1, wherein said ramped plate or lath member comprises a lath that is configured so as to extend from said securement point through said opening in said partition wall.

3. A defiberizing drum in accordance with claim 1, wherein said ramped plate or lath member comprises a plate extending radially from said securement point and having an edge that extends into closer proximity with the drum axis than an edge of said partition wall opening located most closely proximate said securement point.

4. A defiberizing drum in accordance with claim 2, wherein said lath has a surface along which a wire ball forming in said first drum portion is operatively elevatable into proximity with said partition wall opening, and said lath surface extending from said securement point at an angle defined between said surface extension and a radius through said securement point in the range of −30° to +60°.

5. A defiberizing drum in accordance with claim 3, wherein said plate has an edge along which a wire ball forming in said first drum portion is operatively elevatable into proximity with said partition wall opening, and said plate edge extending from said securement point at an angle defined between said edge extension and a radius through said securement point in the range of −30° to +60°.

6. A defiberizing drum in accordance with claim 4, wherein said angle is in the range of 0° to 45°.

7. A defiberizing drum in accordance with claim 5, wherein said angle is in the range of 0° to 45°.

8. A defiberizing drum in accordance with claim 1, wherein said ramped plate or lath member has a surface extending from said securement point to a distal point of least spacing from the drum axis and along which a wire ball forming in said first drum portion is operatively elevatable into proximity with said partition wall opening, and wherein said distal point is located closer to the drum axis than a distance defined, along a radius that passes through said distal point, between the drum axis and an edge of said partition wall opening located most closely proximate said distal point.

9. A defiberizing drum for treating thread-like impurities containing fibrous material and for separating said impurities therefrom, comprising:
    an elongated cylindrical casing mounted for rotation about its longitudinal axis, said casing comprising a first non-perforated portion and a second perforated portion; a partition wall extending within said casing and dividing said drum into said first and second portion, said partition wall having an opening for permitting the flow of said fibrous material from said first to said second portion; and
    a ramped plate or lath means operatively secured to said drum for elevating and transferring said impurities from said first portion to said second portion, said means being located in said first portion at an axial distance from said partition wall and extending in a non-axial drum direction and being configured so that, as the drum rotates about said axis, an agglomeration containing said thread-like impurities forming in said first portion is elevated by said means into proximity with said partition wall opening such that said agglomeration of impurities passes through said wall opening and into said perforated portion of said drum when said agglomeration reaches a predetermined size.

10. A method of treating thread-like impurities containing fibrous material and of separating said impurities therefrom, said method comprising:
    introducing a thread-like impurities containing fibrous material into a first non-perforated portion of a cylindrical drum;
    rotating said drum about its longitudinal axis in a direction;
    collecting said thread-like impurities in form of an agglomeration in said first portion of said drum;
    permitting said fibrous material to flow from said first portion through a partition wall opening into a second perforated portion of said drum;
    transferring said thread-like impurities containing agglomeration from said non-perforated drum portion through said partition wall opening into said perforated drum portion when said agglomeration reaches a predetermined size by providing a ramped plate or lath member in said first non-perforated drum portion, said plate or lath member extending at an axial distance from said partition wall and in non-axial drum direction so as to elevate said impurities containing agglomeration into proximity with said partition wall opening and passing said agglomeration through said wall opening into said second perforated drum portion;
    discharging said fibrous material through said perforations from said second drum portion; and separately discharging said thread-like impurities containing agglomeration from said second drum portion.

11. The method according to claim 10, wherein said transfer of said thread-like impurities containing agglomeration from said first to said second drum portion is performed by operatively elevating said agglomeration into proximity with said partition wall opening at an angle of −30° to +60° defined between a drum radius and two straight lines so that said lines and said drum radius intersect a single point at the drum circumference.

* * * * *